United States Patent Office 3,536,808
Patented Oct. 27, 1970

3,536,808
USE OF TRIMETHYLENE OXIDE COMPOUNDS
TO COMBAT BACTERIA
Arleen C. Pierce, New Brunswick, N.J., assignor to Allied
Chemical Corporation, New York, N.Y., a corporation
of New York
No Drawing. Filed Sept. 15, 1967, Ser. No. 668,170
Int. Cl. A01n 9/28, 17/02
U.S. Cl. 424—278
5 Claims

ABSTRACT OF THE DISCLOSURE

This specification discloses a method for combating microorganisms by treating them with a chemical agent including trimethylene oxide or certain substituted derivatives thereof in vapor phase. These agents have been found to be effective sterilizing agents, particularly against *Staphylococcus aureus* cells.

---

The usual methods of sterilization, such as use of steam, heat, chemical solution, radiation, and the like, are impractical when large areas, such as hospital rooms, laboratories, and animal quarters, are to be sterilized. This may be true also when sterilization of articles which may be adversely affected by moisture or heat, such as delicate laboratory and medical equipment or fabrics, plastics, and the like, is required. Sterilization problems of this kind can frequently be overcome by using chemical antimicrobial agents in vapor phase to produce sterilization. Effective vapor phase chemical antimicrobial agents must be capable of being readily introduced into the area to be treated; of rapidly and thoroughly penetrating all porous surfaces in the area; of effectively penetrating the microorganisms to be treated and of controlling them, e.g. by destroying them or by inhibiting their propagation at normal temperatures and relative humidities, and of being readily removed by aeration.

There are few chemical agents which can meet these stringent requirements, and thus, the use of vapor phase antimicrobial agents has been limited up to the present time. Further, many known vapor phase chemical antimicrobial agents require the presence of moisture in order to be effective, either in the air surrounding the space or in the articles to be sterilized. Under dry climatic conditions moisture must be added, which may present certain difficulties of proper penetrability of the mixture in the space to be sterilized or of damage to moisture-sensitive equipment.

It is a primary objective of this invention to provide a method of combating microorganisms with a chemical agent in vapor phase.

It is another object to provide a method of combating microorganisms with a chemical agent in vapor phase over a wide range of relative humidity at normal temperatures.

Further objects will become apparent from the following detailed description thereof.

According to the method of the present invention, microorganisms can be controlled by treating them with a trimethylene oxide of the formula

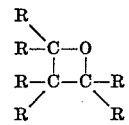

wherein R at each occurrence is a member independently selected from the group consisting of hydrogen, fluorine, chlorine, alkyl radicals having the formula —(CY$_2$)$_n$CY$_3$ wherein Y is a member independently selected from the group consisting of hydrogen, fluorine, and chlorine, and $n$ is an integer from 0 to 2, and aryl radicals and wherein at least two carbon atoms have a hydrogen or fluorine substituent. Preferably, the carbon atoms adjacent to the oxygen atom will have at least one hydrogen or fluorine substituent.

Compounds suitable for use in the invention include trimethylene oxide, 1,2,2 - trimethyl - 3 - phenyltrimethylene oxide, 1-methyltrimethylene oxide, 1,2-dimethyltrimethylene oxide, 1,2-ditrifluoromethyl-2,3,3-trifluorotrimethylene oxide, 1,1,2 - trifluoromethyl - 2,3,3 - trifluoromethylene oxide, 1,2-ditrifluoromethyltetrafluorotrimethylene oxide, 1-chlorotrimethylene oxide, 1,3-dichlorotrimethylene oxide, 2-trifluoromethyltrimethylene oxide, perfluorotrimethylene oxide, and the like.

The compositions of the invention can be prepared by reacting potassium hydroxide with the corresponding 3-halo-1-propanol or its acetate ester or by photochemical reaction of an olefin with a carbonyl-containing compound. Compositions having the formula

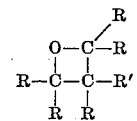

wherein R and R' are hydrogen, alkyl, or aryl radicals are formed by exposing a mixture containing an aldehyde or ketone and a tri- or tetrasubstituted olefin to ultraviolet light, as disclosed by Buchi et al. JACS 76, 4327 (1954).

Polyfluorooxetanes have been prepared by ultraviolet irradiation of a refluxing mixture of a terminal fluoroolefin and either a fluoroaldehyde, fluoroacyl fluoride, or fluoroketone as disclosed by J. F. Harris and D. D. Coffman, JACS 84, 1553 (1962).

The trimethylene oxide compounds which are liquid can be introduced into the area to be sterilized in its liquid form and allowed to penetrate the area by evaporation. Alternatively, the trimethylene oxide compound can be admixed with a diluent inert gas or mixture of gases. As an example, air can be bubbled into the trimethylene oxide compound and the resultant air stream passed into the area to be sterilized. The trimethylene oxide compound can also be admixed with a suitable propellent mixture and sprayed into the area, dissolving the compound in a suitable solvent if required.

A trimethylene oxide compound of the invention can be used as the sole active ingredient in combating microorganisms or, if desired, one or more can be used with other known vapor phase antimicrobial agents such as ethylene oxide. In addition to the diluent, the trimethylene oxide compound can be used with other vaporizable components such as deodorants, perfumes, water vapor, and the like.

As is known in the prior art, the dosages of a chemical antimicrobial agent required to effect control can vary widely depending upon the particular microorganisms to be controlled, the size of the area to be treated, the time within which it is desired to effect control and environmental conditions such as temperature, relative humidity, etc. In the preferred method of practicing the invention, a sufficient amount of a trimethylene oxide compound as described herein is employed so as to provide the desired toxicity. The dosages that will be required to sterilize a particular area to insure control of microorganisms can be readily ascertained, as will be known to one skilled in the art.

The following examples will serve to further illustrate the invention, but it is to be understood that the invention is not to be limited to the details described therein. In the examples all parts are by weight unless otherwise noted.

EXAMPLE 1

One-tenth ml. portions of trimethylene oxide were charged to one-liter flasks containing air of a predetermined relative humidity. Circular patches of cotton cloth each having an area of about 2 cm. sq. and impregnated with an aqueous suspension of about $5 \times 10^6$ *Staphylococcus aureus* cells and subsequently dried, were suspended by wires about halfway down into the flasks. The flasks were stoppered and the contaminated patches exposed to trimethylene oxide vapor for periods of one, four, and twenty-four hours. At the end of the exposure periods the patches were removed and assayed for remaining microorganisms as follows: the patches were placed in dilution blanks composed of an aqueous solution of 0.1 percent by volume of lecithin and 0.71 percent by volume of a suitable emulsifier, which in this case was available as Tween 80, trademark of the Atlas Powder Company, comprising polyoxyethylene derivatives of fatty acid partial esters of hexitol anhydrides and the solution was adjusted to pH 7.0 with 1 N sodium hydroxide. Microorganisms remaining on the patches were dislodged by shaking and aliquots were placed in enriched nutrient agar. After incubation for forty-eight hours at 37° C., the percentage of microoragnisms killed by the test trimethylene oxide was calculated by comparison of the numbers found after exposure with an assay of unexposed contaminant patches. Bacteria counts were made with a Quebec Colony counter. After four hours' exposure to trimethylene oxide vapor at both 50% and 90% relative humidity at room temperature, 100% of the *Staphylococcus aureus* cells were killed.

EXAMPLE 2

1-chlorotrimethylene oxide vapor is tested against *Staphylococcus aureus* cells following the procedure given in Example 1. A comparable bactericidal effect is noted.

EXAMPLE 3

1,2 - ditrifluoromethyl - 2,3,3 - trifluorotrimethylene oxide vapor is tested against *Staphylococcus aureus* cells following the procedure given in Example 1. A comparable bactericidal effect is noted.

EXAMPLE 4

1-methyltrimethylene oxide vapor is tested against *Staphylococcus aureus* cells following the procedure given in Example 1. A comparable bactericidal effect is noted.

It will be apparent that numerous modifications and variations may be effected without departing from the scope of the novel concepts of the present invention, and the illustrative details disclosed herein are not to be construed as imposing undue limitations on the invention.

I claim:

1. A method for combating bacteria which comprises treating said bacteria with an effective amount of a compound having the formula

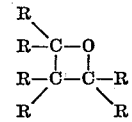

wherein R at each occurrence is a member independently selected from the group consisting of hydrogen, fluorine, chlorine, alkyl radicals having the formula $-(CY_2)_nCY_3$ wherein Y is a member independently selected from the group consisting of hydrogen fluorine, and chlorine and $n$ is an integer from 0 to 2, and phenyl and wherein at least two carbon atoms have a hydrogen or fluorine substituent, in vapor phase.

2. A method according to claim 1 wherein the carbon atoms adjacent to the oxygen atom have at least one substituent selected from the group consisting of hydrogen and fluorine.

3. A method according to claim 1 wherein said bacteria are *Staphylococcus aureus* cells.

4. A method according to claim 1 wherein said compound is trimethylene oxide.

5. A method according to claim 4 wherein said bacteria are *Staphylococcus aureus* cells.

References Cited

UNITED STATES PATENTS 3,238,096  3/1966  Kaye _____ 424—278

ALBERT T. MEYERS, Primary Examiner

D. M. STEPHENS, Assistant Examiner

U.S. Cl. X.R.

424—244